United States Patent [19]
Lin

[11] Patent Number: 6,029,939
[45] Date of Patent: Feb. 29, 2000

[54] DUSTER PEDESTAL

[75] Inventor: Cee Lin, Chung-Hua, Taiwan

[73] Assignee: Mei Darl Li Duster Co., Ltd., Chung-Hua, Taiwan

[21] Appl. No.: 09/186,889

[22] Filed: Nov. 6, 1998

[51] Int. Cl.[7] .............................. A47B 91/00; F16M 11/24
[52] U.S. Cl. ...................................... 248/346.03; 248/165
[58] Field of Search .................................. 248/529, 346.3, 248/165, 519, 523, 110, 111, 346.03, 188.7, 176.1

[56] References Cited

U.S. PATENT DOCUMENTS

| | | | |
|---|---|---|---|
| 1,423,951 | 7/1922 | Lurtz | 248/188.7 |
| 1,510,661 | 10/1924 | Ellingsen | 248/165 |
| 3,078,063 | 2/1963 | Frankl | 248/188.7 |
| 3,310,180 | 3/1967 | Neagle | 211/205 |
| 4,728,067 | 3/1988 | Steinmetzer et al. | 248/188.7 |

*Primary Examiner*—Derek J. Berger
*Assistant Examiner*—David Heisey
*Attorney, Agent, or Firm*—Smith, Gambrell & Russell, LLP

[57] ABSTRACT

A duster pedestal comprises a main body, a plurality of fins and an annular seat which are capable of being easily and rapidly assembled together thereby supporting an inserted duster in straight, or resolved thereby folding in a limited space advantageous to the transportation, storage, delivery and packing thereof.

3 Claims, 5 Drawing Sheets

DUSTER PEDESTAL

FIELD OF THE INVENTION

The present invention relates to a duster pedestal, and particularly to a duster pedestal for supporting an inserted duster straight.

DESCRIPTION OF PRIOR ART

In general, a plastic duster as a home appliance is inconvenient in storage and incongruous in respect of home decor. Although a variety of pedestals for properly positioning and decorating the dusters are continuously proposed to conform with the duster, the inconvenience in assembly and storage thereof for most customers may reduce the desire to purchase. Especially in assembly of lesser pedestals, improper designs thereof may further result in a permanent damage to the structures which is not capable of being repeatedly assembled or disassembled. Other pedestals, designed to avoid the inconvenience of assembly are integrally formed with parts thereof, such as a supporting leg. As soon as a supporting leg is damaged or broken, the entire pedestal becomes ineffective due to the irreplaceable supporting leg.

As such a pedestal is integrated, it cannot be folded for the transportation, storage, delivery and packing by manufacturers or customers. Thus, a structural improvement is required in view of most of the duster pedestal manufactured.

SUMMARY OF THE INVENTION

Based on the foregoing disadvantage, it is an objective of this present invention to provide an improved duster pedestal capable of being easily assembled and resolved for the convenience of the transportation, storage, delivery and packing thereof.

Another objective of this present invention provides an improved duster pedestal capable of holding an inserted duster straight in a limited space as a home decoration.

BRIEF DESCRIPTION OF THE DRAWINGS

In order that the present invention may more readily be understood the following description is given, merely by way of example with reference to the accompanying drawings, in which.

DETAILED DESCRIPTION OF THE PREFERRED EMBODIMENT

Figure 1:
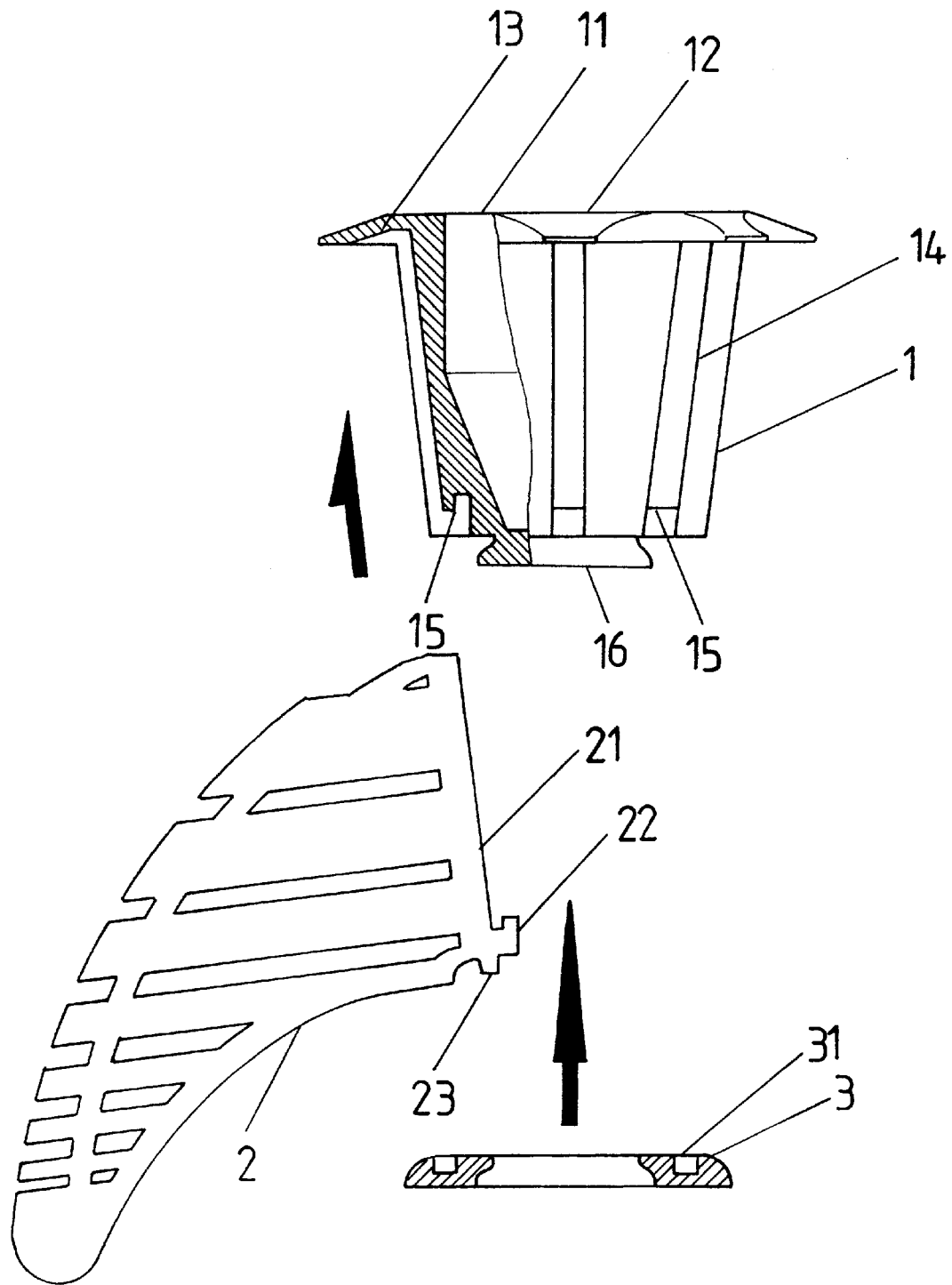
FIG. 1 is a partially cross-sectional exploded view of a duster pedestal in accordance with the present invention.

Referring to the cross-sectional view shown in FIG. 1, a pedestal in accordance with the present invention includes a main body 1. The main body 1 is further defined with a coned through hole 11 (or other demanded shapes) defined in a center thereof, and a plurality of spaced teeth 12 as a crown located at a top portion thereof, and a concave slot 13 formed below the respective tooth. An elongated side slot 14 is downwardly extended from each corresponding concave slot 13 to a reverse recess 15 entering in a bottom edge of the main body 1, along an outer sidewall of the main body 1. A coned base 16 attached to the bottom edge of the main body is shaped in conformance with a contour of said side slot 14.

A plurality of fins 2 for equally supporting the main body 1 in straight each has a retention section 21 at a lateral side thereof and is arranged with an upper hook 22 and a lower hook 23 in a twig (an end branch) at a down-right corner thereof, in conformance with a contour of said coned base 16. An annular seat 3 has an opening in conformation with a contour of the coned base 16, and a plurality of spaced caves 31 arranged with respect to the reverse recesses 15 of the main body 1 and located between an inner wall and an outer wall of the opening.

Figure 2:
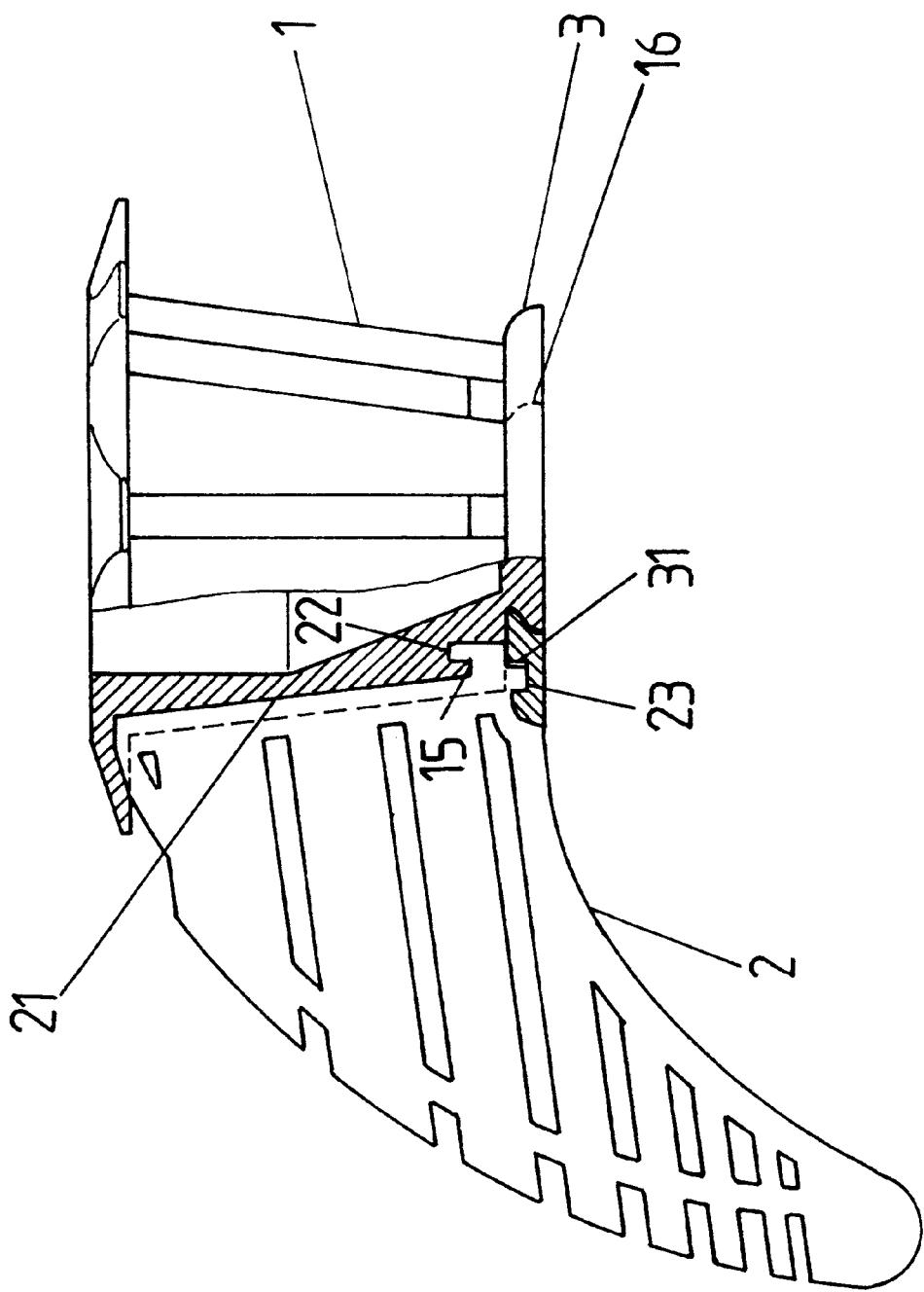
FIG. 2 is a partially cross-sectional assembled view of the duster pedestal shown in FIG. 1.

Further referring to FIGS. 2 & 3, in assembly of the aforementioned parts, a top edge of retention section 21 of each fin 2 firstly abuts against the associated concave slot 13 defined below the teeth 12 of the main body 1. Then, the upper hook 22 of the fin 2 is retentively inserted into the reverse recess 15 of the main body 1 and the retention section 21 of the fin 2 is further received within the side slot 13 whereby the fins 2 can be temporarily retained on the main body 1. Furthermore, the annular seat 3 is equipped below the main body 1 and the fins 2. The lower hook 23 of each fin 2 is inserted into the corresponding cave 31 and likewise, the entire coned base 16 is fastened to the opening of the annular seat 3 thereby preventing the fins 2 from being separated from the main body 1. Hence, all of parts of the duster pedestal are capable of being easily and rapidly assembled together, as shown in FIG. 4, for supporting an inserted duster 4 (as shown in FIG. 3) in straight.

In contrast, when disassembled the retention of the annular seat 3 to the main body 1 can be released by downward pulling. Then, each fin 2 is capable of being easily and rapidly taken out of the main body 1 thereby folding in a limited space advantageous to the transportation, storage, delivery and packing thereof.

Figure 3:
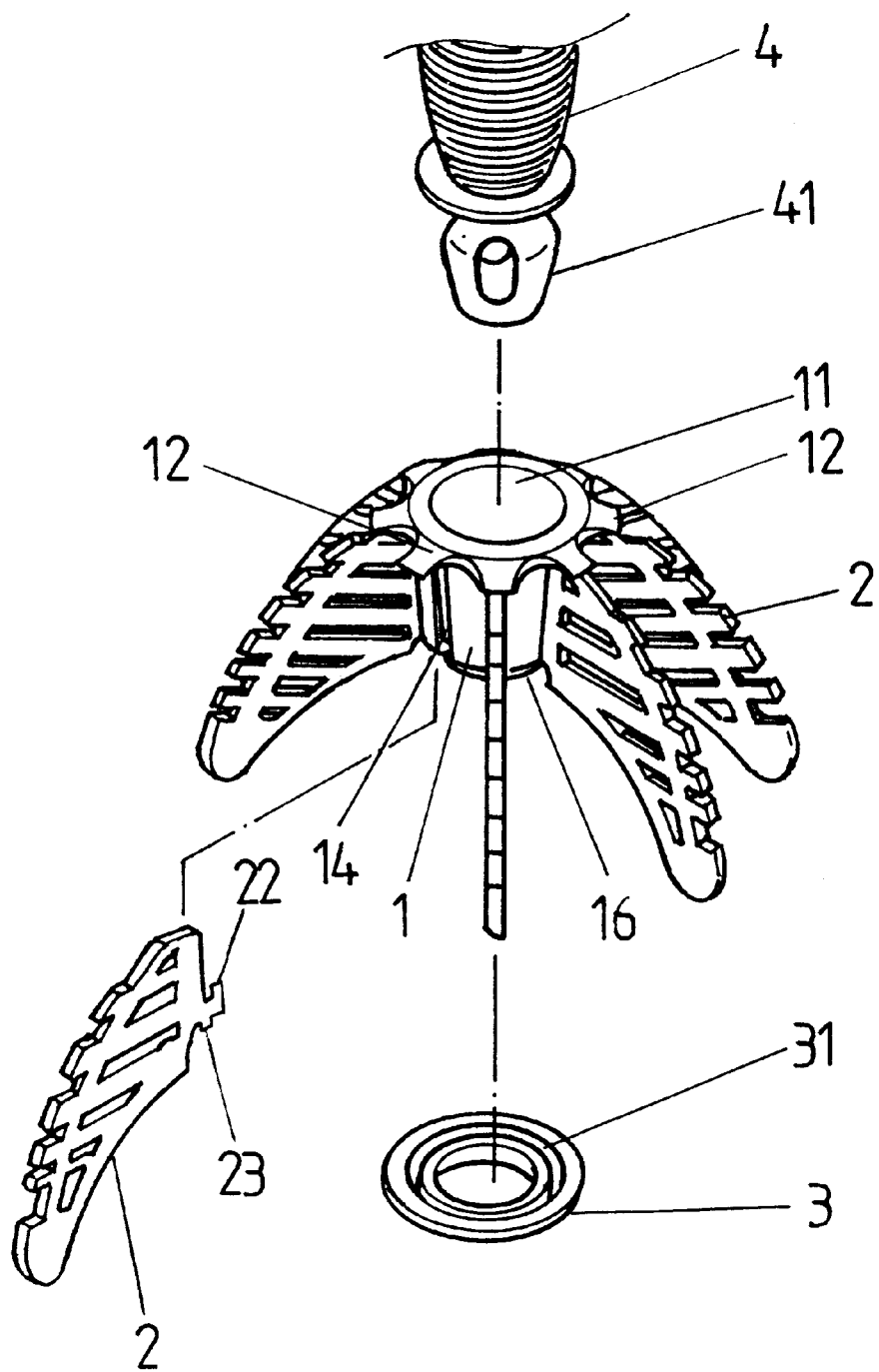
FIG. 3 is an exploded perspective view of the duster pedestal shown in FIG. 1.
Figure 4:
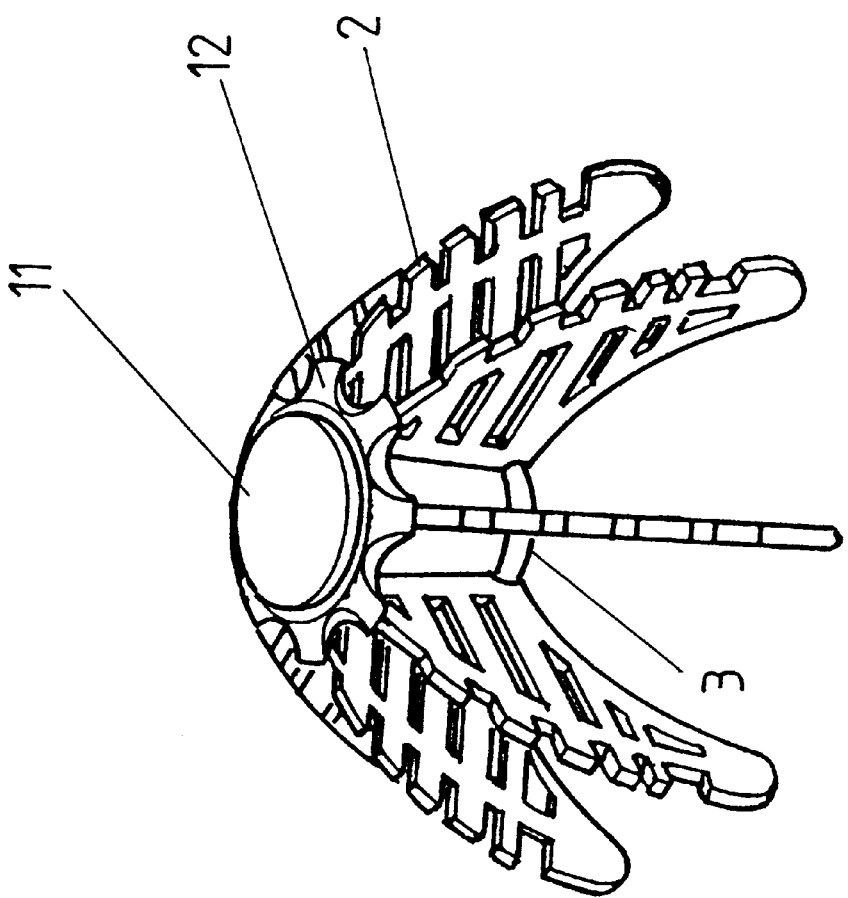
FIG. 4 is an assembled perspective view of the duster pedestal shown in FIG. 1.
Figure 5:
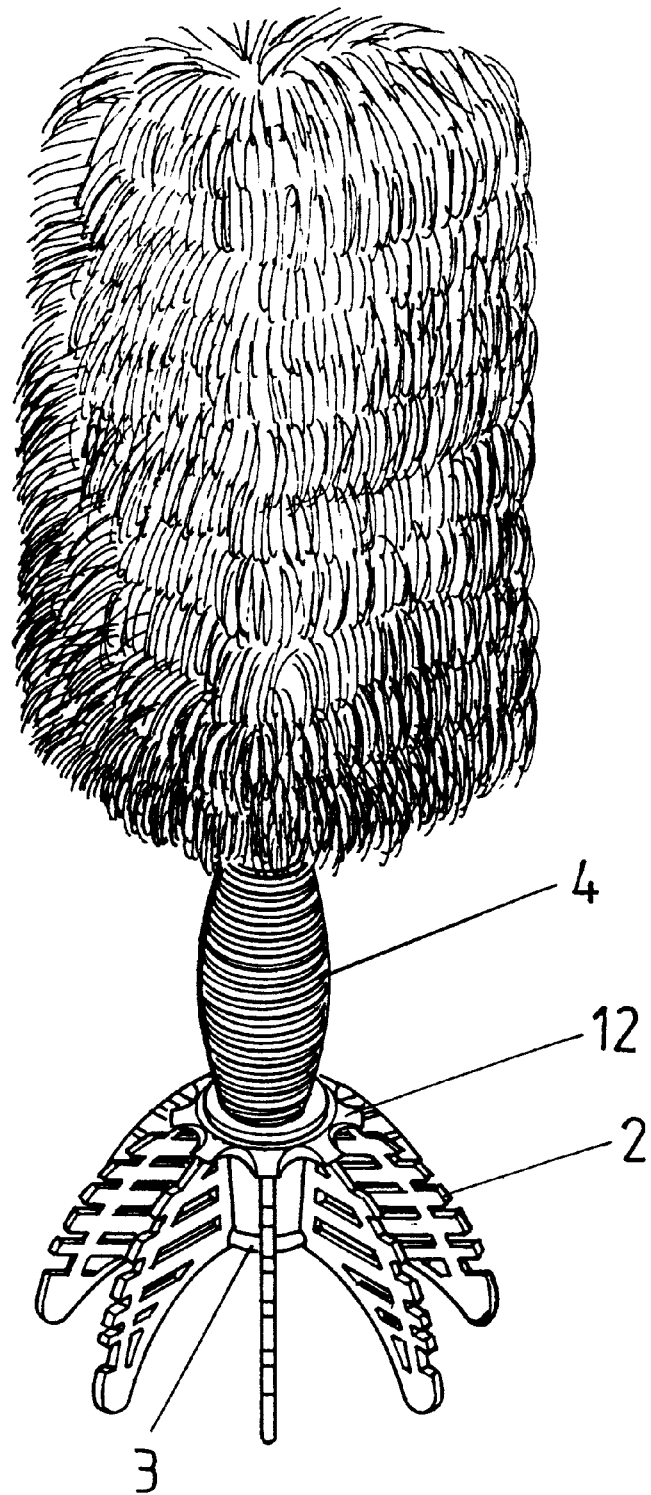
FIG. 5 is an assembled perspective view of the duster pedestal shown in FIG. 4 where a duster is inserted.

As shown in FIGS. 3 & 5, a plastic duster 4 has a coned handle 41 (or other demanded shapes) in a tip thereof which is adapted in direct insertion into the coned through hole 11 of the main body 1. Hence, the duster 4 is capable of being stably straightened as being a pleasing home decoration.

In conclusion, it is known that the duster pedestal in accordance with the present invention actually offers more merits in comparison with the conventional structure in convenience of the transportation, storage, delivery and packing thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A storage pedestal assembly for a duster, comprising:
a main body, having a bottom edge, a top portion, an outer sidewall, and a coned through hole defined in a center thereof, and having a plurality of spaced teeth located at the top portion thereof, each of said teeth corresponding with a concave slot thereunder, said teeth further corresponding to an elongated side slot downwardly extending along the outer sidewall from each of said corresponding concave slots to define a reverse recess at the bottom edge of the main body, said main body further provided with a coned base at the bottom edge thereof;

an annular seat having an opening which corresponds to said coned base of said main body when assembled, and which has a plurality of spaced cavities therein which correspond to said elongated side slots of said main body; and, a plurality of fins for supporting the main body of the pedestal in an upright position, each fin comprising a retention section which corresponds to said elongated slot of said main body, said retention section provided with an upper hook which corresponds with said reverse recess of said main body, and a lower hook which corresponds with said spaced cavities of said annular seat, such that when each of said plurality of fins is inserted in said corresponding concave slots and corresponding elongated side slots, and said upper hooks of said fins are inserted in said reverse recesses, and said coned base of said main body is thereafter inserted into said opening of said annular seat, the fins are held firmly in place to form the pedestal so that a duster can be rested in an upright position by inserting a handle of said duster in said coned through hole of said main body of said pedestal.

2. The storage pedestal assembly according to claim 1, which is assembled by a process comprising:

abutting a top edge of the retention section of each fin against the associated concave slot defined below the teeth of the main body;

retentively inserting the retention section of each fin into the corresponding side slot while retentively inserting the upper hook of each fin into the reverse recess of the main body whereby the fins can be retained on the main body;

retentively inserting the lower hook of each fin into the corresponding cavity of said annular seat; and retentively inserting the entire coned base of said main body into the opening of the annular seat, thereby preventing the fins from being separated from the main body, while allowing the annular seat of the main body to be released by pulling downward on said annular seat whereby each fin can then be removed from the main body.

3. A duster in combination with the storage pedestal assembly for a duster according to claim 1, the duster having a conical handle corresponding to said coned through hole of said main body, such that when said duster is placed in said coned through hole of said main body, said duster is positioned in an upright posture by said conical handle being properly engaged with said coned through hole of said main body of the pedestal.

* * * * *